United States Patent [19]
Wadsworth et al.

[11] 3,758,619
[45] Sept. 11, 1973

[54] HYDROCARBON CONVERSIONS IN THE PRESENCE OF ONIUM COMPOUNDS

[75] Inventors: Francis T. Wadsworth, Trenton, N.J.; Charles G. McAlister, deceased, late of Lake Charles, La. by Bernice McAlister, heir

[73] Assignee: Cities Service Company, New York, N.Y.

[22] Filed: Dec. 30, 1970

[21] Appl. No.: 102,999

[52] U.S. Cl. ...... 260/659 A, 260/650 R, 260/648 R
[51] Int. Cl. ............................................. C07c 17/06
[58] Field of Search .................... 260/659 A, 662 A, 260/654 A, 658 R, 663

[56] References Cited
UNITED STATES PATENTS
3,488,398  1/1970  Harpring et al ................. 260/659 A
3,462,501  8/1969  Hornig et al .................... 260/654 A Primary Examiner—Bernard Helfin
Assistant Examiner—Joseph A. Boska
Attorney—J. Richard Geaman

[57] ABSTRACT

A variety of hydrocarbon conversions including chlorinations, oxychlorinations, oxidations and oxidative dehydrogenations are carried out using onium compounds as catalysts or catalyst-reaction media. Generally, the reactants are passed through a melt of the onium compound or, alternatively, through a bed of the onium compound. The onium compound is preferably either a simple salt or a complex salt.

1 Claim, No Drawings

HYDROCARBON CONVERSIONS IN THE PRESENCE OF ONIUM COMPOUNDS

BACKGROUND OF THE INVENTION

The preparation of halogenated, particularly chlorinated, hydrocarbons and especially light hydrocarbons is an important industrial process. The chlorination of light hydrocarbons has a number of drawbacks. The reaction of hydrocarbons with chlorine is highly exothermic and difficult to control and, in the case of paraffin hydrocarbons, large quantities of by-product hydrogen chloride for which a ready market is not always available are produced.

Attempts have been made to overcome the latter difficulty by substituting a hydrogen chloride-air mixture as the chlorinating agent in place of free chlorine while using an appropriate catalyst such as copper chlorides or iron chlorides. It has been found that under these conditions there is relatively poor conversion of hydrogen chloride and the reaction is even more exothermic than direct chlorination. Furthermore, reaction temperatures of about 400° to 500°C are required.

SUMMARY OF THE INVENTION

It is an object of this invention to provide processes for hydrocarbon conversions which proceed at low reaction temperatures.

It is another object of this invention to provide processes for hydrocarbon conversions which give good yields of desirable products.

It is yet another object of this invention to provide processes for hydrocarbon conversions in which reaction temperatures are readily controlled.

It is still another object of this invention to react mixtures of hydrogen halide, a source of oxygen, and hydrocarbon to produce desirable halogenated, oxyhalogenated, oxidized, and dehydrogenated hydrocarbon derivatives.

Still other objects will appear hereinafter.

The foregoing objects are attained in accordance with this invention. In general, this invention comprises a process for hydrocarbon conversion comprising contacting a mixture of hydrogen halide, a source of oxygen, and hydrocarbon with a catalyst comprising an onium compound selected from the group consisting of ammonium, oxonium, sulfonium, phosphonium, and nitronium compounds.

By proceeding according to our invention, hydrocarbons are readily converted to halogenated, oxyhalogenated, oxidized, and dehydrogenated derivatives at relatively low reaction temperatures and in good yields.

DESCRIPTION OF THE PREFERRED EMBODIMENTS

The onium compounds that are useful as catalysts-reaction media in the practice of this invention are selected from the group consisting of ammonium $(NR_4)^+$, oxonium $(OR_3)^+$, sulfonium $(SR_3)^+$, phosphonium $(PR_4)^+$ and nitronium $(NO_2)^+$ compounds wherein R may be hydrogen or an organyl group. Suitable organyl groups are substituted or unsubstituted alkyl, alkenyl, naphthyl or aryl groups. R may also be an alkylene or alkenylene group which involves the heteroatom in a ring, i.e., heterocyclic compounds such as pyridine, quinoline, thiophene, furan, piperidine, etc. In addition, compounds capable of forming two or more like or unlike onium ions per molecule, e.g., ethylenediamine, bipyridyl, and phenanthroline, may be used in the practice of this invention.

The counter ions associated with the onium ions may be either simple anions or complex anions. Examples of simple anions are $F^-$, $Cl^-$, $Br^-$, $I^-$, $OH^-$, $SH^-$, $CN^-$, $SCN^-$, $HSO_4^-$ and $H_2PO_4^-$. Examples of complex anions are $[CuCl_4]^{-2}$, $[FeCl_6]^{-3}$, $[Co_2Cl_6]^{-2}$, $[BiCl_5]^{-2}$, and $[SbCl_5]^{-2}$.

The preferred onium compounds are pyridinium salts, both simple and complex. The most preferred pyridinium salts are pyridinium chloride and the pyridinium chloride-cupric chloride complex.

The preparation of the onium compounds may be achieved by conventional methods. The preparative methods are typified by considering the preparation of pyridinium chloride and pyridinium chloride-cupric chloride complex. Pyridinium chloride may be prepared by adding the stoichiometric amount of concentrated aqueous hydrochloric acid to pyridine. Removal of the water by distillation yields a pot residue of anhydrous pyridinium chloride. The cupric chloride complex is prepared by adding anhydrous cupric chloride to anhydrous pyridinium chloride and gently heating the stirred mixture until solution of the copper salt is complete. The resulting solution of pyridinium chloride-cupric chloride complex in pyridinium chloride is then ready for use as a catalyst or catalyst-reaction medium.

The hydrocarbon conversions of this invention are carried out by contacting a mixture of hydrogen halide, a source of oxygen, and hydrocarbon with the onium compound catalyst or catalyst-reaction medium. Depending on the hydrocarbon, the nature of the onium compound, and the reaction conditions, the hydrocarbon may undergo halogenation, hydrohalogenation, oxyhalogenation, oxidation, oxidative dehydrogenation, or combinations of these reactions. The preferred hydrogen halide from the point of view of economy as well as other considerations is hydrogen chloride. The preferred source of oxygen is air.

The ratios of the components of the reactants will vary depending on the hydrocarbon, the source of oxygen, the onium compound, and the desired product. Generally, the molar ratio of air to hydrocarbon is from about 2:1 to about 15:1. and preferably from about 2.5:1 to about 10:1. The molar ratio of hydrogen halide to hydrocarbon is usually about 0.5:1 to about 6:1, and preferably about 0.65:1 to about 4:1.

The hydrocarbon conversions are carried out at a temperature within the range of about 85° to about 350°C and preferably about 150° to about 320°C. In the case where the onium compound is functioning as a catalyst and also as the reaction medium, the onium compound is in the liquid phase. The onium compound is melted and the reactants are either pressured into a closed reactor containing the melt or are bubbled through the melt. The reactions may be carried out in batch, semi-batch, or continuous fashion.

In certain conversions it may be advantageous to employ the onium compounds solely as a catalyst. In this case the onium compound, either unsupported or supported on a suitable substrate, is employed in fixed, turbulent, or fluidized bed operations.

While it is anticipated that hydrocarbons generally may be used in the practice of this invention, hydrocarbons containing from about 1 to about 20 carbons are preferred. The hydrocarbons may be aliphatic, naphthenic, aromatic or contain various mixtures of aliphatic, naphthenic and aromatic segments. Aliphatic and naphthenic segments may be either saturated or unsaturated. Examples of hydrocarbons that are particularly useful in the practice of this invention are methane, ethylene, ethane, propylene, propane, butanes, butenes, pentanes, pentenes, hexanes, hexenes, cyclohexane, cyclohexene, octanes, octenes, decanes, undecenes, dodecanes, pentadecenes, heptadecanes, heptadecenes, nonadecanes, eicosanes, toluene, ethylbenzene, and xylenes.

The following examples will serve to further illustrate this invention.

EXAMPLE I

An aqueous pyridinium chloride solution is prepared by adding the stoichiometric amount of concentrated aqueous hydrochloric acid to a weighed amount of reagent grade pyridine. Most of the water is removed by distillation of the solution leaving a substantially anhydrous, crude pyridinium chloride as the pot residue. To 911.5 g. (7.89 moles) of the crude pyridinium chloride is added 61.8 g. (0.47 mole) of anhydrous cupric chloride. The stirred mixture is gently heated until solution of the copper salt is complete. The resultant solution of the complex $(C_5H_5NH)_2^+$ $(CuCl_4)^{-2}$ in pyridinium chloride is ready for use as a catalyst or catalyst-reaction medium.

EXAMPLE II

The stoichiometric amount of cupric chloride hydrate required to give the complex $(C_5H_5NH)_2^+$ $(CuCl_4)^{-2}$ is added to a concentrated aqueous solution of pyridinium chloride prepared as in Example I above. Water is removed by heating on a steam bath at a pressure of about 25 mm. Hg. The pyridinium chloride-cupric chloride complex may be dissolved in pyridinium chloride to give a solution similar to that in Example I, it may be sized appropriately for use as a catalyst in a turbulent or fluidized bed operation, or it may be supported upon a suitable carrier for use as a catalyst as described in Example III below.

Pyridinium chloride complexes of bismuth chloride and antimony chloride are also prepared by the method of this Example.

EXAMPLE III

A pyridinium chloride-cupric chloride complex prepared as in Example II is dissolved in hot methanol. To the resulting solution are added ¼ inch alumina spheres which are impregnated with the complex by boiling the mixture. The methanol is partially removed by spin-drying at ambient temperature and about 25mm. Hg. Final drying is in a forced-draft oven maintained at 120°C. The supported catalyst is then ready for use.

Impregnation of a similar support has also been accomplished using a solution of the same complex in concentrated aqueous hydrochloric acid. Thus isolation of the complex is not necessary in the preparation of supported catalysts; the complexes can be conveniently deposited on a support from the acid solutions in which they are easily prepared.

EXAMPLE IV

A pyridinium chloride-cupric chloride complex prepared as in Example II is dissolved in pyridinium chloride. Hydrogen chloride, air, and ethylene in the mole ratio 0.2/0.5/0.2, respectively, are introduced through a glass frit into the molten solution of the complex in pyridinium chloride. The catalyst-reaction medium is maintained at about 190°C and stirred vigorously during feeding of the reaction mixture. Effluent gases are first passed through a steam-heated reflux condenser which partially condenses and returns to the reaction flask entrained pyridinium chloride vapor. The remaining gases then pass through an ice water-cooled trap to knock out the remaining pyridinium chloride, water, and high boiling chlorinated hydrocarbons. Gases emerging from the cold trap then pass to an on-stream gas chromatograph.

Gas chromatography shows the principal low boiling chlorinated products to be ethyl chloride and 1,2-dichloroethane with possible traces of vinyl chloride. Examination of the condensates from the ice water knock-back reveals 1,2-dichloroethane and symmetrical tetrachloroethane as the principal chlorinated hydrocarbons in that phase. Samples containing as much as 10 weight percent organic-bound chlorine are obtained from the cold trap.

EXAMPLE V

Hydrogen chloride, air, and p-xylene in respective mole ratios of 0.4/1.0/0.1 are fed through a glass frit into a melt of a solution of pyridinium chloride-cupric chloride complex in pyridinium chloride, prepared as described in Example IV, under conditions which favor oxychlorination. The melt is maintained at about 200°C and stirred vigorously during feeding of the reaction mixture. Effluent gases first pass through a steam-heated reflux condenser and then through an ice water-cooled trap before being vented. The liquid condensate collected in the cold trap consists of two phases. The upper phase contains 8.26 weight percent of organic-bound chlorine and the lower phase contains 4.75 weight percent of organic-bound chlorine.

EXAMPLE VI

A supported pyridinium chloride-cupric chloride complex catalyst prepared as in Example III is screened in ethylene oxychlorination runs at hydrogen chloride, air, and ethylene feed mole ratios of 0.3/1.0/0.3, respectively. The temperature range probed is from 100° to 270°C. Ethylene conversion starts at about 170°C, indicating the high activity of the catalyst in this application. At about 240°C, and operating as above, the conversion of hydrogen chloride to 1,2-dichloroethane is very nearly quantitative with only traces of other products being detectable.

EXAMPLE VII

The supported catalyst described in Example VI is screened as an ethane oxychlorination-oxidative dehydrogenation catalyst. Operating in the temperature range from 100°C to about 320°C and using a feed of hydrogen chloride, air, and ethane having a mole ratio of 0.2/1.0/0.3, respectively, ethane conversion is first observed at the surprising low temperature of about 220°C. Conversion increases with increasing temperatures up to the highest temperature probed, about 320°C. At that temperature and with the ethane in the feed rich with respect to the hydrogen chloride, ethyl chloride and 1,2-di-chloroethane are the principal chlorinated products. Ethyl chloride and 1,2- dichloroethane are formed in a weight ratio of about 3 parts to 2 parts, respectively.

The activity of these supported catalysts for the oxidative dehydrogenation of ethane is illustrated by the fact that major product formed from ethane in the above series of runs is ethylene. About 4 parts of ethylene are formed for each 3 parts of combined ethyl chloride and 1,2-dichloroethane.

It is to be understood that many modifications and variations can be practiced without departing from the scope of the present invention as defined in the appended claims.

What is claimed is:

1. A process which comprises contacting a mixture of hydrogen chloride, air, and ethylene with an alumina-supported pyridinium chloride-cupric chloride complex catalyst at a temperature of about 170°–270°C.

* * * * *